US012784333B2

(12) United States Patent
Li

(10) Patent No.: US 12,784,333 B2
(45) Date of Patent: Nov. 3, 2026

(54) SECONDARY LIGHT OCCLUSION RENDERING METHOD AND APPARATUS, AND RELATED PRODUCT

(71) Applicant: Tencent Technology (Shenzhen) Company Limited, Shenzhen (CN)

(72) Inventor: Weimin Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 121 days.

(21) Appl. No.: 18/826,003

(22) Filed: Sep. 5, 2024

(65) Prior Publication Data

US 2024/0428509 A1 Dec. 26, 2024

Related U.S. Application Data

(63) Continuation of application No. PCT/CN2023/123241, filed on Oct. 7, 2023.

(30) Foreign Application Priority Data

Nov. 3, 2022 (CN) ......................... 202211372129.6

(51) Int. Cl.
*G06T 15/50* (2011.01)
*H04N 19/597* (2014.01)

(52) U.S. Cl.
CPC ......... *G06T 15/506* (2013.01); *H04N 19/597* (2014.11)

(58) Field of Classification Search
None
See application file for complete search history.

(56) References Cited

U.S. PATENT DOCUMENTS

2011/0012901 A1* 1/2011 Kaplanyan ............ G06T 15/506 345/426
2021/0035356 A1* 2/2021 Castaneda ............. G06T 15/506
2024/0428509 A1* 12/2024 Li ......................... H04N 19/597
2025/0259378 A1* 8/2025 Zhou ....................... G06T 15/06

FOREIGN PATENT DOCUMENTS

CN 111420404 A 7/2020

OTHER PUBLICATIONS

Tencent Technology, ISRWO, PCT/CN2023/123241, Dec. 26, 2023, 6 pgs.

* cited by examiner

*Primary Examiner* — Ryan M Gray
(74) *Attorney, Agent, or Firm* — Morgan, Lewis & Bockius LLP

(57) ABSTRACT

This application discloses a secondary light occlusion rendering method performed by a computer device. The method includes: obtaining direction information of a secondary light in an environment including a virtual object and data of a plurality of vertexes on a model of the virtual object; decoding the encoding results based on the direction information to obtain decoded vertex occlusion information; and obtaining secondary light occlusion rendering data of the virtual object based on the decoded vertex occlusion information respectively corresponding to the plurality of vertexes and light intensity information of the secondary light. In this way, textures do not need to be read frame by frame, thereby reducing consumption of performance of a computing device. The rendering solution is based on vertexes on a model and is not affected by a change in a movement direction of a virtual object.

17 Claims, 14 Drawing Sheets

FIG. 3
Occlusion is not
calculated and rendered

FIG. 4
Occlusion is calculated
and rendered

| $l$ | $m$ | $\Phi(\varphi)$ | $\Theta(\theta)$ | Expression in polar coordinates | Expression in rectangular coordinates | Notation in quantum mechanics |
|---|---|---|---|---|---|---|
| 0 | 0 | $\frac{1}{\sqrt{2\pi}}$ | $\frac{1}{\sqrt{2}}$ | $\frac{1}{2\sqrt{\pi}}$ | $\frac{1}{2\sqrt{\pi}}$ | s |
| 1 | 0 | $\frac{1}{\sqrt{2\pi}}$ | $\sqrt{\frac{3}{2}}\cos\theta$ | $\frac{1}{2}\sqrt{\frac{3}{\pi}}\cos\theta$ | $\frac{1}{2}\sqrt{\frac{3}{\pi}}\frac{z}{r}$ | $p_z$ |
| 1 | +1 | $\frac{1}{\sqrt{2\pi}}\exp(i\varphi)$ | $\frac{\sqrt{3}}{2}\sin\theta$ | $\frac{1}{2}\sqrt{\frac{3}{\pi}}\sin\theta\cos\varphi$ | $\frac{1}{2}\sqrt{\frac{3}{\pi}}\frac{x}{r}$ | $p_x$ |
| 1 | -1 | $\frac{1}{\sqrt{2\pi}}\exp(-i\varphi)$ | $\frac{\sqrt{3}}{2}\sin\theta$ | $\frac{1}{2}\sqrt{\frac{3}{\pi}}\sin\theta\sin\varphi$ | $\frac{1}{2}\sqrt{\frac{3}{\pi}}\frac{y}{r}$ | $p_y$ |

FIG. 11

SECONDARY LIGHT OCCLUSION RENDERING METHOD AND APPARATUS, AND RELATED PRODUCT

CROSS-REFERENCE TO RELATED APPLICATIONS

This application is a continuation application of PCT Patent Application No. PCT/CN2023/123241, entitled "PALM IMAGE PROCESSING METHOD AND APPARATUS, DEVICE, STORAGE MEDIUM, AND PROGRAM PRODUCT" filed on Oct. 7, 2023, which claims priority to Chinese Patent Application No. 202211372129.6, entitled "SECONDARY LIGHT OCCLUSION RENDERING METHOD AND APPARATUS, AND RELATED PRODUCT" filed with the China National Intellectual Property Administration on Nov. 3, 2022, both of which are incorporated herein by reference in their entirety.

FIELD OF THE TECHNOLOGY

This application relates to the field of rendering technologies, and in particular, to secondary light occlusion rending.

BACKGROUND OF THE DISCLOSURE

In scenarios such as game development and animation production, a secondary light refers to a light source that illuminates a virtual object in addition to a primary light source. In the real world, a shadow is to be projected on an object in a case that light directed at the object is occluded. However, for the game development and the animation production, calculation of occlusion shadows usually consumes a lot of performance of computing devices. Therefore, in many games running on mobile devices, generally, an occlusion effect of only the primary light source is displayed, and calculation for occlusion of the secondary light is canceled to ensure device performance. Consequently, unnatural light spots appear where shadows are supposed to be when the secondary light illuminates a virtual object. In the industry, this problem is referred to as light leakage. To resolve the problem of light leakage, the following two methods can be used currently.

In one solution, for each secondary light, a minimum depth that is of each object in each frame and that is in a space coordinate system corresponding to a light direction of the secondary light is calculated, and the minimum depth is stored to a render texture corresponding to the frame. The render texture is a texture created and updated by a game engine, namely, Unity, at runtime. When it is determined through calculation that the object is affected by the secondary light, coordinates of the object are converted into the space coordinate system of the light direction, and then new coordinates are used to sample a corresponding render texture to obtain a depth. If the depth of the object is greater than the depth of the object that is stored in the render texture, the object is occluded. However, in this solution, because calculation for occlusion is performed frame by frame, and calculation is needed for refresh for each frame, operation performance consumption is greatly high. Moreover, each secondary light corresponds to one render texture. If there are a plurality of secondary lights, excessive render textures are to be read for each frame, which leads to high bandwidth usage. High bandwidth means high power consumption. Therefore, this solution is not applicable to a mobile device.

SUMMARY

Embodiments of this application provide a secondary light occlusion rendering method and apparatus, and a related product, to render a natural and accurate secondary light occlusion effect and reduce consumption of device performance.

A first aspect of this application provides a secondary light occlusion rendering method performed by a computer device, the method including:

obtaining direction information of a secondary light in an environment including a virtual object and data of a plurality of vertexes on a model of the virtual object, the data of each vertex comprising an encoding result of vertex occlusion information;

decoding the encoding results based on the direction information to obtain decoded vertex occlusion information, the vertex occlusion information being obtained by performing light occlusion detection on the vertex in advance; and obtaining secondary light occlusion rendering data of the virtual object based on the decoded vertex occlusion information respectively corresponding to the plurality of vertexes and light intensity information of the secondary light.

A second aspect of this application provides a secondary light occlusion rendering device. The device includes a processor and a memory.

The memory is configured to store a computer program and transmit the computer program to the processor.

The processor is configured to perform operations of the secondary light occlusion rendering method according to the first aspect based on the computer program.

A third aspect of this application provides a non-transitory computer-readable storage medium, configured to store a computer program, the computer program being used for performing operations of the secondary light occlusion rendering method according to the first aspect.

In view of the foregoing technical solution, embodiments of this application have the following advantages.

In the technical solution of this application, light occlusion detection is performed on vertexes of a virtual object in advance to obtain vertex occlusion information, to include the vertex occlusion information in data of the vertexes. When an occlusion effect of a secondary light on a model of the virtual object actually needs to be rendered, direction information of the secondary light in an environment where the virtual object is located and data of a plurality of vertexes on the model of the virtual object are obtained, and for each vertex, the direction information of the secondary light is used to decode an encoding result of vertex occlusion information stored in the data of the vertex, so as to obtain decoded vertex occlusion information of the vertexes. Finally, secondary light occlusion rendering data of the virtual object is obtained based on the decoded vertex occlusion information and light intensity information of the secondary light. The occlusion effect of the secondary light on the virtual object is presented based on the secondary light occlusion rendering data. The vertex occlusion information is detected in advance and stored in the data of the vertexes in an encoded form, and during rendering, the data of the vertexes can be simply fetched to perform corresponding decoding, without a need of reading textures frame by frame. Therefore, consumption of performance of a computing device can be reduced, and high performance of a device is ensured while a secondary light occlusion effect is rendered and represented, which makes the technical solution more applicable to a mobile device. In addition, the rendering solution is based on vertexes on a model, and is therefore not affected by a change in a movement direction of the virtual object in a world coordinate system of the virtual object. Furthermore, in this solution, importance of a direction of the secondary light is also taken into consideration. The encoding results in the data of the vertexes are decoded based on the direction information of the secondary light, to form the secondary light occlusion rendering data based on both the decoded vertex occlusion information and the light intensity of the secondary light. Therefore, according to this rendering solution, a natural and physically accurate secondary light occlusion effect can be displayed, thereby improving visual experience of a user (game player or animation viewer).

BRIEF DESCRIPTION OF THE DRAWINGS

FIG. 11 is a table of a spherical harmonic basis function.

DESCRIPTION OF EMBODIMENTS

Figure 1:
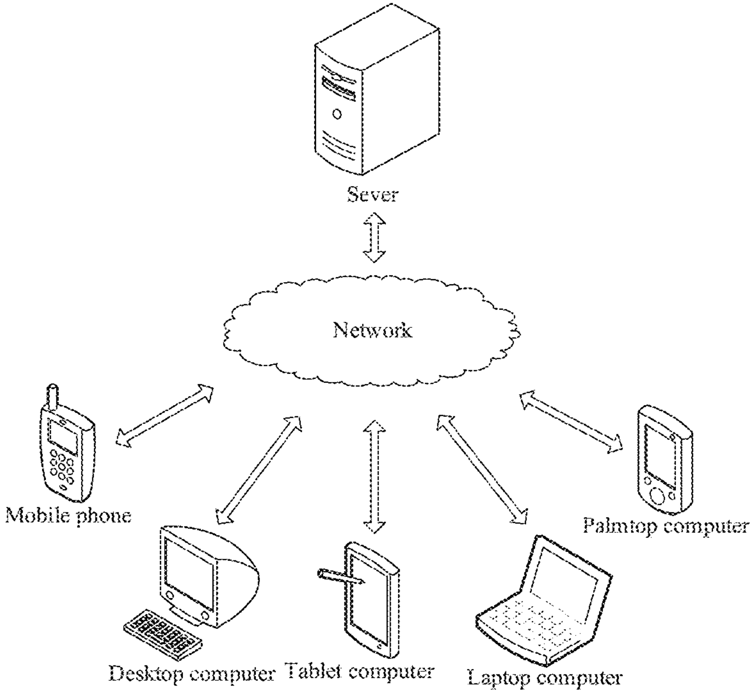
FIG. 1 is a diagram of a scene architecture of a secondary light occlusion rendering method according to an embodiment of this application.

In an animation production scenario or a game scenario, to obtain a secondary light occlusion effect, render textures corresponding to each secondary light may be read frame by frame to compare depth information so as to determine occlusion of the secondary light on an object, resulting in a heavy bandwidth burden, high power consumption, and consumption of a lot of operation performance of a computing device. Although operation performance can be saved to some extent by drawing an occlusion image by an art designer, occlusion image production that relies on a manual drawing technology exhibits low efficiency and brings high labor costs and manual workload. Moreover, the drawing of the occlusion image cannot cope with changes in a direction of the secondary light and a motion state of a virtual object, and a physical effect is therefore not accurate. Although the foregoing two solutions are designed to resolve a problem of light leakage, the solutions also bring new problems while resolving the problem of light leakage, or a rendering effect can hardly satisfy the requirement of a natural and realistic visual effect after the problem of light leakage is resolved.

In view of the foregoing problem, this application provides a secondary light occlusion rendering method and apparatus, and a related product, to provide a rendering solution that can achieve a natural and physically accurate secondary light occlusion effect and reduce consumption of device performance. Therefore, labor costs are and workload are reduced, and rendering efficiency is improved. In the technical solution provided in this application, vertex occlusion information respectively corresponding to vertexes is obtained by performing light occlusion detection on the vertexes on a model of a virtual object in advance. The vertex occlusion information is encoded and stored in data of the vertexes. During rendering, encoding results of the vertex occlusion information can be simply fetched from the data of the vertexes, and then decoded based on direction information of an actual secondary light to obtain decoded occlusion information of the vertexes. Finally, secondary light occlusion rendering data of the virtual object is obtained based on the decoded vertex occlusion information of the vertexes on the model and light intensity of the secondary light. According to this solution, a light intensity condition provided by the secondary light is satisfied, and existence of occlusion is presented in terms of a secondary light occlusion rendering effect. In terms of visual observation of a user, it can be found that when the virtual object is illuminated by the secondary light, a corresponding position on the virtual object that occludes transmission of light form a natural and accurately positioned shadow at another position on the virtual object, such as a shadow behind the neck formed by long hair or a shadow of a fold in clothes.

First, terms that may be involved in the following embodiments of this application are explained.

Houdini: a three-dimensional computer graphics software.

HDA: Houdini digital asset, which packages a Houdini node network into a reusable digital asset.

Houdini Engine: Allows for import of an HDA into another software for use.

Unity: a cross-platform two-dimensional (2D) and three-dimensional (3D) game engine developed by Unity Technologies, which allows for development of cross-platform video games and extension to a WebGL technology-based HTML5 web platform as well as new generation multimedia platforms such as tvOS, Oculus Rift, and ARKit.

Secondary light: a light source that illuminates an object in addition to a primary light source.

Light leakage: To improve performance, a mobile device usually cancels shadow occlusion calculation of a secondary light, resulting in unnatural light spots appearing at positions of shadows when the secondary light illuminates an object.

Spherical harmonic: an angular part of a solution of Laplace's equation in a spherical coordinate system. The spherical harmonic is a famous function in modern mathematics and is widely used in quantum mechanics, computer graphics, rendering and lighting processing, spherical mapping, and the like.

Basis function: In mathematics, a basis function is a basis in function space, just like a coordinate axis in Euler space. In the function space, every continuous function can be expressed as a linear combination of the basis function.

Vertex: A model surface of a virtual object produced by three-dimensional modeling includes a plurality of vertexes, and there are connecting lines between adjacent vertexes. Three vertexes and lines between the vertexes form a triangle, and the model surface includes a lot of triangles formed similarly.

UV: Texture coordinates in three-dimensional modeling usually have two coordinate axes, namely, U and V. Therefore, the texture coordinates are referred to as UV coordinates. U represents distribution on a horizontal coordinate and V represents distribution on a vertical coordinate.

UV2 and UV3: Refer to a second model UV and a third model UV, which are only used for storing encoding results of vertex occlusion information herein. Data of a vertex includes UV2 and UV3 corresponding to the vertex.

Tangent plane: Any single vertex in all mesh triangles or quadrilaterals that form a model is a space origin, a normal of the vertex is an N-axis, and a plane passing through the vertex origin and perpendicular to the normal N-axis of the vertex is a tangent plane.

Tangent space: Two axes that pass through a vertex origin on a tangent plane and extend in the same directions as UV texture axes of the vertex are used as TB axes on the tangent plane, and a normal is used as an N-axis. Local space defined by the TBN vector axes is referred to as vertex tangent space.

Render texture: a texture created and updated by Unity at runtime.

Bandwidth: Video memory bandwidth indicates a rate of data transmission between a display chip and a video random-access memory, is measured in bytes per second, and is calculated using a formula of: video memory bandwidth-operating frequency*video memory bit width/8 bits. On a mobile device, the bandwidth is one of the important factors affecting power consumption of the mobile device.

Shader: It is used for implementing image rendering and is an editable program that replaces a fixed rendering pipeline. A vertex shader is mainly responsible for operations of, for example, a geometrical relationship of vertexes, and a pixel shader is mainly responsible for calculation of a color of a fragment and the like.

Virtual scene: The virtual scene displayed (or provided) when an application is running on a terminal may be a simulation scene of the real world, a semi-simulation and semi-fictional scene, or a pure fictional scene. The virtual scene may be any one of a two-dimensional virtual scene, a two-and-a-half-dimensional virtual scene, or a three-dimensional virtual scene. An example in which the virtual scene is a three-dimensional virtual scene is used in the following embodiments for description, but not for limitation. In one embodiment, the virtual scene is also for a virtual scene battle between at least two virtual objects.

Virtual object: a movable object in a virtual scene. The movable object may be at least one of a virtual character, a virtual animal, or a cartoon character. When the virtual scene is a three-dimensional virtual scene, the virtual object may be a three-dimensional model created based on a skeletal animation technology. Each virtual object has its own shape and volume in the three-dimensional virtual scene, and occupies a portion of space in the three-dimensional virtual scene.

The secondary light occlusion rendering method provided in embodiments of this application may be performed by a terminal device. For example, Unity is run on the terminal device to obtain secondary light occlusion rendering data of a virtual object. In an example, the terminal device may specifically include but is not limited to a mobile phone, a computer, an intelligent speech interaction device, a smart home appliance, an on-board terminal, or an aerial vehicle. Embodiments of the present disclosure may be applied to various scenarios, including but not limited to digital humans, virtual humans, games, virtual reality, extended reality (XR), and the like. In addition, the secondary light occlusion rendering method provided in embodiments of this application may alternatively be performed by a server. In other words, Unity may be run on the server to obtain secondary light occlusion rendering data of a virtual object. If a game runs on a terminal device, the server can further send the rendering data to the terminal device, on which a picture is specifically displayed based on the rendering data. In addition, a process of performing preprocessing to obtain encoding results of vertex occlusion information may be implemented on the terminal device, or may be implemented on a server that communicates with the terminal device. Therefore, an implementation entity for performing the technical solution of this application is not limited in embodiments of this application.

FIG. 1 is an example diagram of a scene architecture of a secondary light occlusion rendering method. A server and various forms of terminal devices are included in the figure. The server shown in FIG. 1 may be an independent physical server, a server cluster including a plurality of physical servers, or a distributed system. In addition, the cloud server may alternatively be a cloud server that provides basic cloud computing services such as a cloud service, a cloud database, cloud computing, a cloud function, cloud storage, a network service, cloud communication, a middleware service, a domain name service, a security service, a CDN, and a big data and artificial intelligence platform.

Figure 2:
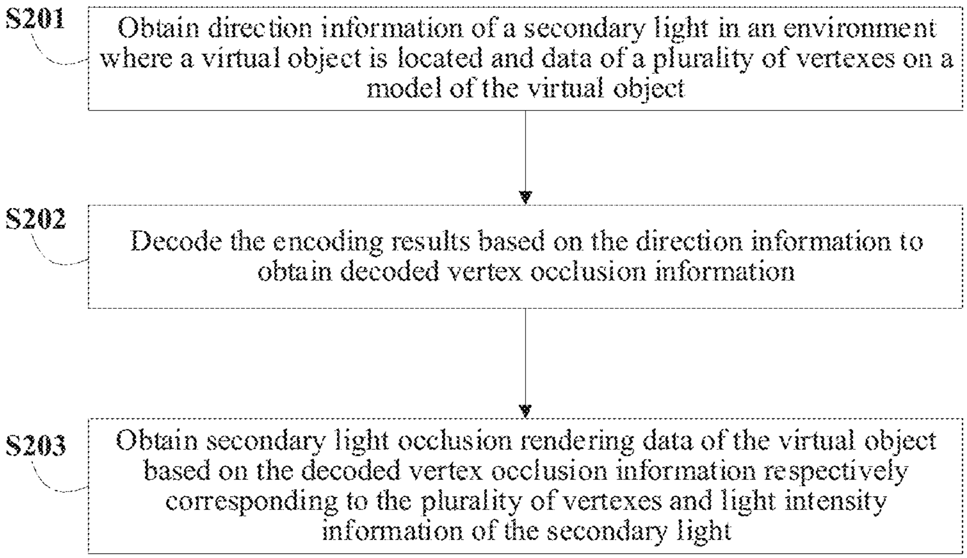
FIG. 2 is a flowchart of a secondary light occlusion rendering method according to an embodiment of this application.

FIG. 2 is a flowchart of a secondary light occlusion rendering method according to an embodiment of this application. As shown in FIG. 2, the secondary light occlusion rendering method includes:

S201: Obtain direction information of a secondary light in an environment where a virtual object is located and data of a plurality of vertexes on a model of the virtual object.

The environment where the virtual object is located may be specifically a virtual scene where the virtual object is located. At least one secondary light is provided in the virtual scene. The secondary light has its own projection direction (or referred to as an illumination direction). To achieve realistic and natural rendering, the direction information of the secondary light needs to be obtained at first. The direction information of the secondary light may be represented by a vector, such as direction information represented by a direction vector in a coordinate system. In subsequent application, the direction information of the secondary light that is obtained in this operation is for information decoding.

Each vertex on the model of the virtual object has its own corresponding data, such as a position and a color. In this embodiment of this application, the data of the vertex also includes an encoding result of vertex occlusion information; A main purpose of obtaining the data of the vertex in this operation is to obtain the encoding result of the vertex occlusion information stored in the data of the vertex. The vertex occlusion information is obtained by performing light occlusion detection on the vertex in advance, which may be understood as detection completed before a game engine renders a secondary light occlusion effect. After being obtained in advance, the vertex occlusion information is stored in the data of the vertex before being used in a rendering stage.

After this operation in which the direction information of the secondary light in the environment where the virtual object is located and the encoding results of the vertex occlusion information of the plurality of vertexes on the model of the virtual object are obtained, S202 can be performed for information decoding.

S202: Decode the encoding results based on the direction information to obtain decoded vertex occlusion information.

At a model preprocessing stage in this embodiment of this application, the vertex occlusion information is specifically encoded based on direction information of rays emitted by a virtual light source toward the vertexes. The rays may also be understood as light emitted by the virtual light source toward the vertexes. Because a light source is virtual at the preprocessing stage, the light is not light emitted by a light source existing in the virtual scene. The light is referred to as rays herein to avoid misunderstanding. To accurately decode the vertex occlusion information, in this embodiment of this application, a technical means consistent with that used for encoding is used to decode encoded information of the vertex occlusion information based on the direction information of the secondary light obtained in S201. The vertex occlusion information obtained through decoding is similar to vertex occlusion information before encoding, but cannot be ensured to be completely identical. Therefore, to avoid misunderstanding the two concepts, the information obtained through decoding in S202 is referred to as decoded vertex occlusion information.

In an exemplary implementation, the vertex is regarded as a center of a sphere, and virtual light sources are regarded as scattered points arranged within a preset range around the vertex to emit rays toward the vertex, so as to simulate light directions of the virtual light sources illuminating the vertex. Rays formed by different virtual light sources are discrete, and occlusion of the rays is also independent and discrete. Therefore, for the vertex, vertex occlusion information of these different rays may be regarded as approximate functions distributed in spherical space. Spherical harmonics may be used to construct an equation to relate to the approximate function. In an exemplary implementation, the spherical harmonics are used for encoding. The encoding result of the vertex occlusion information is specifically a spherical harmonic coefficient obtained by encoding the vertex occlusion information using direction information of the rays and the spherical harmonics. In the operation S202, the spherical harmonic coefficient may be decoded based on the direction information of the secondary light and the spherical harmonics, to obtain the decoded vertex occlusion information. Use of the spherical harmonics for encoding and decoding aligns with a distribution form of the vertex occlusion information, reduces storage space occupied by the information and facilitates indexing, and can further achieve accurate information restoration.

S203: Obtain secondary light occlusion rendering data of the virtual object based on the decoded vertex occlusion information respectively corresponding to the plurality of vertexes and light intensity information of the secondary light.

In actual application, the decoded vertex occlusion information respectively corresponding to the plurality of vertexes may be multiplied by light intensity of the secondary light to obtain the secondary light occlusion rendering data of the virtual object. In some possible implementation scenarios, there are a plurality of secondary lights in the virtual scene where the virtual object is located. In this case, in S202, the encoding results of the vertex occlusion information of the plurality of vertexes can be decoded one by one based on direction information of the plurality of secondary lights respectively to obtain decoded vertex occlusion information. The decoded vertex occlusion information includes decoding result sets having one-to-one correspondence to the plurality of secondary lights, and the decoding result sets each includes decoded vertex occlusion information of the plurality of vertexes in respect of a same secondary light. For example, K1 and K2 represent two secondary lights in different directions. Direction information of the secondary light K1 is represented as S1, and direction information of the secondary light K2 is represented as S2. In S202, the encoding results of the vertex occlusion information of the vertexes that are obtained in S201 are decoded based on S1 to obtain the decoded vertex occlusion information of the vertexes. Because the information is obtained through decoding based on S1, the information may be merged into a decoding result set P1. Similarly, the encoding results of the vertex occlusion information of the vertexes that are obtained in S201 are decoded based on S2 to obtain the decoded vertex occlusion information of the vertexes. Because the information is obtained through decoding based on S2, the information may be merged into a decoding result set P2. Therefore, each decoding result set, such as P1 and P2, corresponds to the plurality of vertexes on the model. If all vertexes on the model are used at the preprocessing stage, the decoding result set also corresponds to all vertexes on the model, that is, includes decoding results of occlusion information of all the vertexes.

For an exemplary implementation scenario of the plurality of secondary lights, in the operation S203, rendering sub-data of a corresponding secondary light may be obtained based on the decoding result set and light intensity information of the corresponding secondary light; and secondary light occlusion rendering data of the virtual object under the plurality of secondary lights is obtained based on rendering sub-data of the plurality of secondary lights.

For example, the decoding result sets respectively corresponding to the plurality of secondary lights are each multiplied by light intensity information of the corresponding secondary light to obtain the secondary light occlusion rendering data of the virtual object under the plurality of secondary lights. For example, for the decoding result set P1 obtained through decoding based on the direction information S1 of the secondary light K1, in the operation S203, decoding results included in P1 may be multiplied by light intensity information of the secondary light K1. For the decoding result set P2 obtained through decoding based on the direction information S2 of the secondary light K2, decoding results included in P2 are multiplied by light intensity information of the secondary light K2. In this way, occlusion rendering of the plurality of secondary lights illuminating the virtual object in the virtual scene is implemented. Multiplying decoding results corresponding to each secondary light by light intensity information of the secondary light can also present a natural and physically accurate occlusion effect of the secondary light.

In the secondary light occlusion rendering method provided in the foregoing embodiment, the vertex occlusion information is detected in advance and stored in the data of the vertexes in an encoded form, and during rendering, the data of the vertexes can be simply fetched to perform corresponding decoding, without a need of reading textures frame by frame. Therefore, consumption of performance of a computing device can be reduced, and high performance of a device is ensured while a secondary light occlusion effect is rendered and represented, which makes the method more applicable to a mobile device. In addition, the rendering solution is based on vertexes on a model, and is therefore not affected by a change in a movement direction of the virtual object in a world coordinate system of the virtual object. Furthermore, in this solution, importance of a direction of the secondary light is also taken into consideration. The encoding results in the data of the vertexes are decoded based on the direction information of the secondary light, to form the secondary light occlusion rendering data based on both the decoded vertex occlusion information and the light intensity of the secondary light. Therefore, according to this rendering solution, a natural and physically accurate secondary light occlusion effect can be displayed, thereby improving visual experience of a user (game player or animation viewer).

In the secondary light occlusion rendering method, the direction information of the secondary light used for decoding can be specifically converted into tangent space of the vertex, in other words, direction information in the tangent space is obtained by conversion. With reference to term concepts described above, any single vertex in all mesh triangles or quadrilaterals that form a model is a space origin, a normal of the vertex is an N-axis, and a plane passing through the vertex origin and perpendicular to the normal N-axis of the vertex is a tangent plane. Two axes that pass through a vertex origin on a tangent plane and extend in the same directions as UV texture axes of the vertex are used as TB axes on the tangent plane, and a normal is used as an N-axis. Local space defined by the TBN vector axes is referred to as vertex tangent space. If the vertex occlusion information is encoded based on the direction information of the light in the tangent space of the vertex, in the secondary light occlusion rendering method provided in this application, an encoding result of occlusion information of a corresponding vertex can also be decoded based on the direction information of the secondary light in the tangent space of the vertex. For case of understanding, any target vertex among the plurality of vertexes is used as an example for description (where the target vertex is named only for convenience of referring to the vertex and is not a restrictive expression to refer to a specific vertex). In the method provided in the foregoing embodiment of this application, the operation S202 of decoding the encoding results based on the direction information to obtain decoded vertex occlusion information may specifically include:

converting, for the target vertex, the direction information into tangent space of the target vertex to obtain converted direction information, the converted direction information being configured for identifying a direction of the secondary light in the tangent space of the target vertex; and decoding an encoding result of vertex occlusion information of the target vertex based on the converted direction information to obtain decoded vertex occlusion information corresponding to the target vertex.

For another vertex, similar to the target vertex in the example, the direction information of the secondary light may be converted in coordinate systems and information decoding may be performed according to the foregoing method. In this embodiment of this application, because the vertex occlusion information is information obtained based on a vertex that is not affected by a world coordinate system, the direction information of the tangent space of the vertex is used for both encoding and decoding of the vertex occlusion information, so that neither an encoding result nor a decoding result deviates from the tangent space of the vertex, thereby ensuring accurate encoding and decoding results. In this way, an impact of a directional change (for example, a change in a character movement direction, rotation, or a change in an illumination direction of a secondary light) in the world coordinate system of the model on a secondary light occlusion rendering effect can be reduced to a great extent, to ensure that the rendering effect is realistic, natural, and physically accurate.

Figure 3:
FIG. 3 is a rendering of a virtual character on which secondary light occlusion rendering is not performed.
Figure 4:
FIG. 4 is a rendering of a virtual character on which rendering of a secondary light occlusion effect is performed according to an embodiment of this application.

FIG. 3 is a rendering of a virtual character on which secondary light occlusion rendering is not performed. FIG. 4 is a rendering of a virtual character on which rendering of a secondary light occlusion effect is performed according to an embodiment of this application. FIG. 3 illustrates a corresponding rendering effect when only an occlusion effect of a primary light source is displayed and occlusion calculation of a secondary light is canceled. FIG. 4 shows a rendering effect obtained by applying the secondary light occlusion rendering method provided in an embodiment of this application. It can be learned through comparison of FIG. 3 and FIG. 4 that FIG. 3 does not reflect shadows at some positions where the shadows are expected to be. For example, light illuminating the back of the neck of a model of a virtual object is expected to be occluded by long hair of the virtual object, and light illuminating the back of the right ear is expected to be occluded by a bow in hair accessories of the virtual object, to present shadows. However, the shadows are not presented at corresponding positions in FIG. 3, and skin at these positions are as bright as at other positions. According to the technical solution of this application, shadows of corresponding positions can be rendered. As shown in FIG. 4, shadows are displayed at both the back of the neck and the back of the right car. An arrow at the bottom of FIG. 3 and an arrow at the bottom of FIG. 4 both indicate folds of a collar. According to the technical solution of this application, it can be reflected that there is no fold shadow in FIG. 3 but there are fold shadows in FIG. 4. However, because the color of model clothes can only be displayed in an achromatic form in this application document, the effect of comparison between dark clothes at the folds is not obvious.

Figure 5:
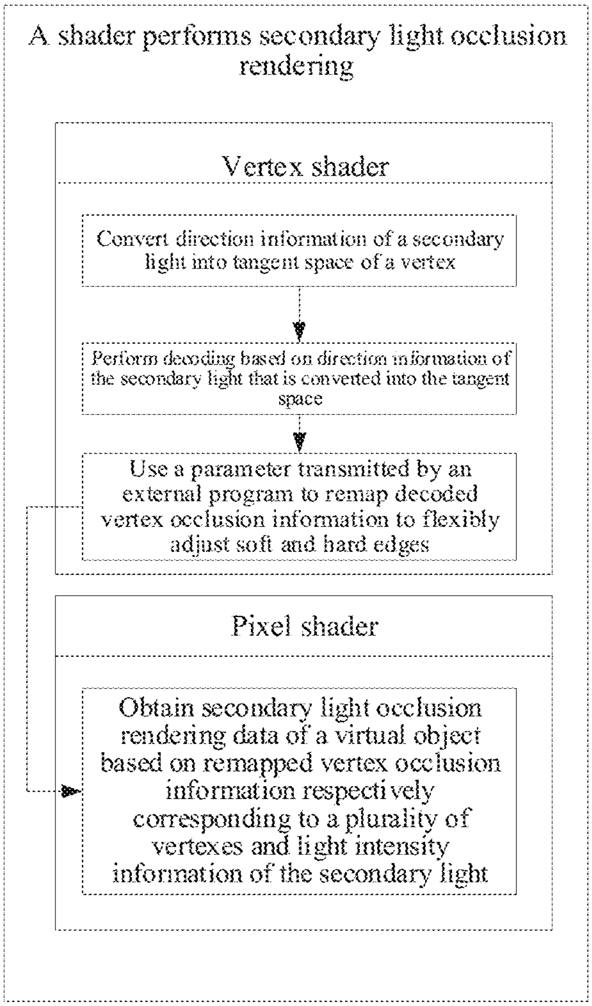
FIG. 5 is a schematic flowchart of operations respectively performed by a vertex shader and a pixel shader during shader rendering.

In the foregoing secondary light occlusion rendering method, a rendering process can be implemented by a shader of a Unity engine. For example, a vertex shader and a pixel shader in the shader are respectively responsible for different operations in the foregoing embodiment. The vertex shader is responsible for converting direction information of a secondary light into tangent space of a vertex, and then decodes an encoding result of vertex occlusion information of the vertex based on direction information of the secondary light in the tangent space of the vertex to obtain the decoded vertex occlusion information corresponding to the vertex. The pixel shader may also be referred to as a fragment shader, and is configured for performing S203, i.e., performing operation based on decoded occlusion information and light intensity information of the secondary light to obtain secondary light occlusion rendering data of the virtual object. In addition, in an exemplary implementation, to allow a user to flexibly adjust soft and hard edges of occlusion, after the vertex shader performs decoding, decoded information in an interval of [0, 1] may be remapped using a parameter transmitted by an external program to obtain occlusion values respectively corresponding to a plurality of vertexes. Subsequently, the pixel shader obtains the secondary light occlusion rendering data of the virtual object based on the occlusion values respectively corresponding to the plurality of vertexes and the light intensity information of the secondary light. For the foregoing process, refer to FIG. 5. FIG. 5 is a schematic flowchart of operations respectively performed by a vertex shader and a pixel shader during shader rendering.

In the foregoing embodiment, a process of shadow rendering of the model of the virtual object when the secondary light is occluded is described in detail. As mentioned above, the model can be preprocessed in advance before rendering. The following describes the preprocessing process in detail with reference to embodiments. For all vertexes on the model, the following preprocessing operations are to be performed. For case of description, only a target vertex is used as an example in the following description of this application. The target vertex is one of a plurality of vertexes on the model and is not special. For vertexes other than the target vertex, the same operations may be performed according to the following procedure.

Figure 6:
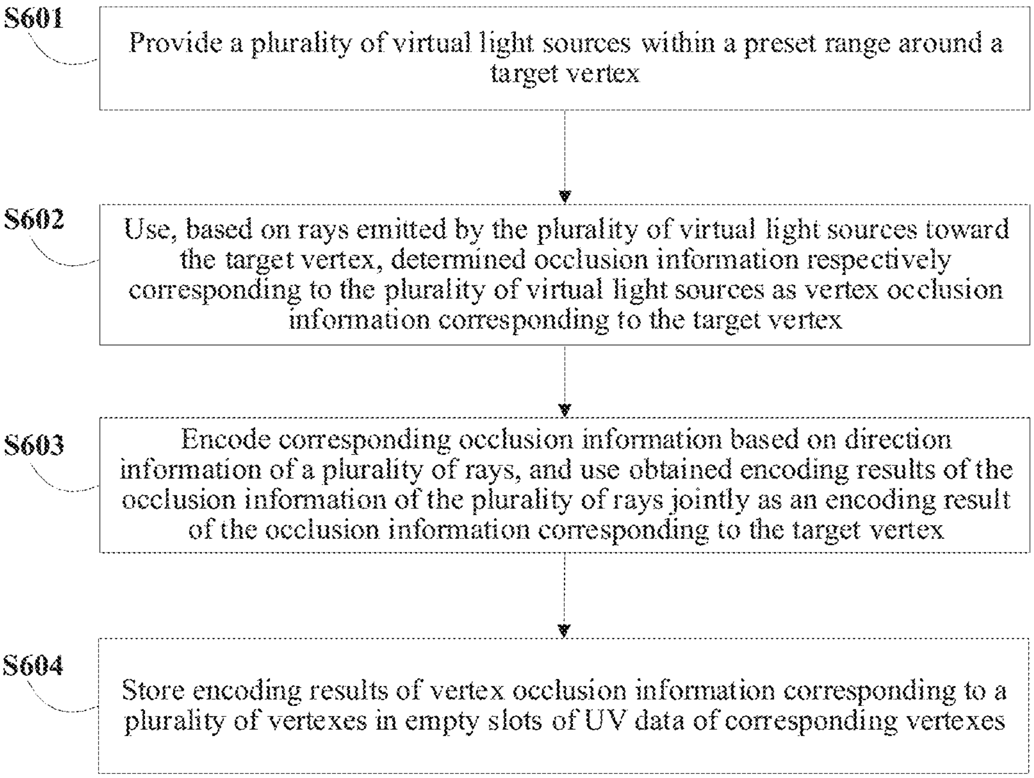
FIG. 6 is a schematic flowchart of a process of preprocessing vertexes on a model according to an embodiment of this application.

FIG. 6 is a schematic flowchart of a process of preprocessing vertexes on a model. The process may be specifically implemented by a model preprocessing tool. As shown in FIG. 6, the process of preprocessing the vertexes on the model includes the following operations.

S601: Provide a plurality of virtual light sources within a preset range around the target vertex.

Figure 7:
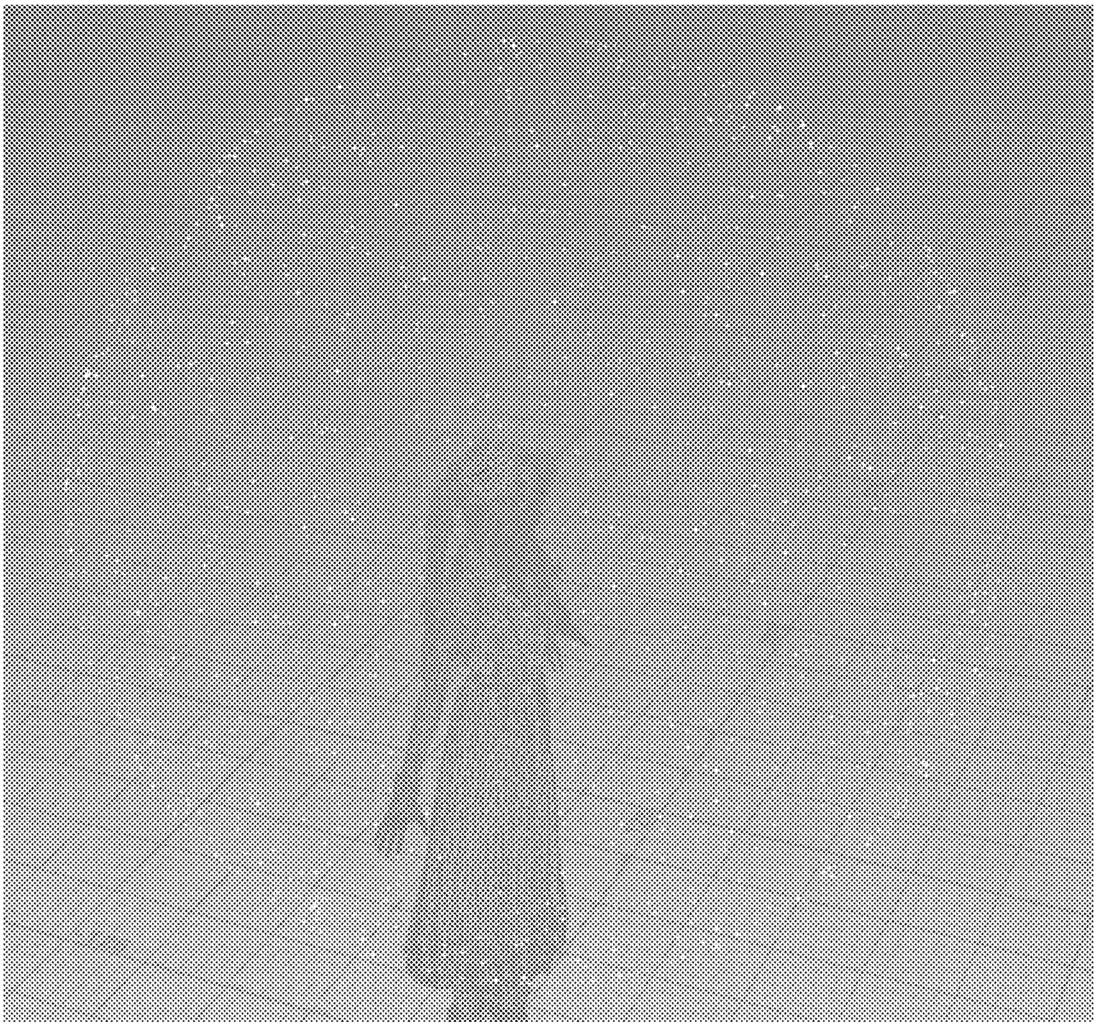
FIG. 7 is a schematic diagram of a plurality of virtual light sources arranged with a specific vertex on a model of a virtual object as a center of a sphere according to an embodiment of this application.

In a specific implementation, the target vertex may be used as a center of a sphere, and points may be evenly scattered within a preset radius as simulated light sources. In an example, the radius is 1 in a world coordinate system where the model is located, and 1000 virtual light sources are provided. Certainly, in actual application, the radius and a quantity of the virtual light sources can be set based on actual needs, and no specific numerical limit is made herein. More virtual light sources indicate more accurate vertex occlusion information obtained through decoding. Fewer virtual light sources indicate less operation time consumed by preprocessing. FIG. 7 is a schematic diagram of a plurality of virtual light sources arranged with a specific vertex on a model of a virtual object as a center of a sphere. The virtual object shown in FIG. 7 is a figure of a girl, and the plurality of virtual light sources are arranged along a sphere surface with a vertex as the center of the sphere.

S602: Use, based on rays emitted by the plurality of virtual light sources toward the target vertex, determined occlusion information respectively corresponding to the plurality of virtual light sources as vertex occlusion information corresponding to the target vertex.

The occlusion information is configured for identifying whether rays emitted by a corresponding virtual halo are occluded by vertexes other than the target vertex.

Figure 8:
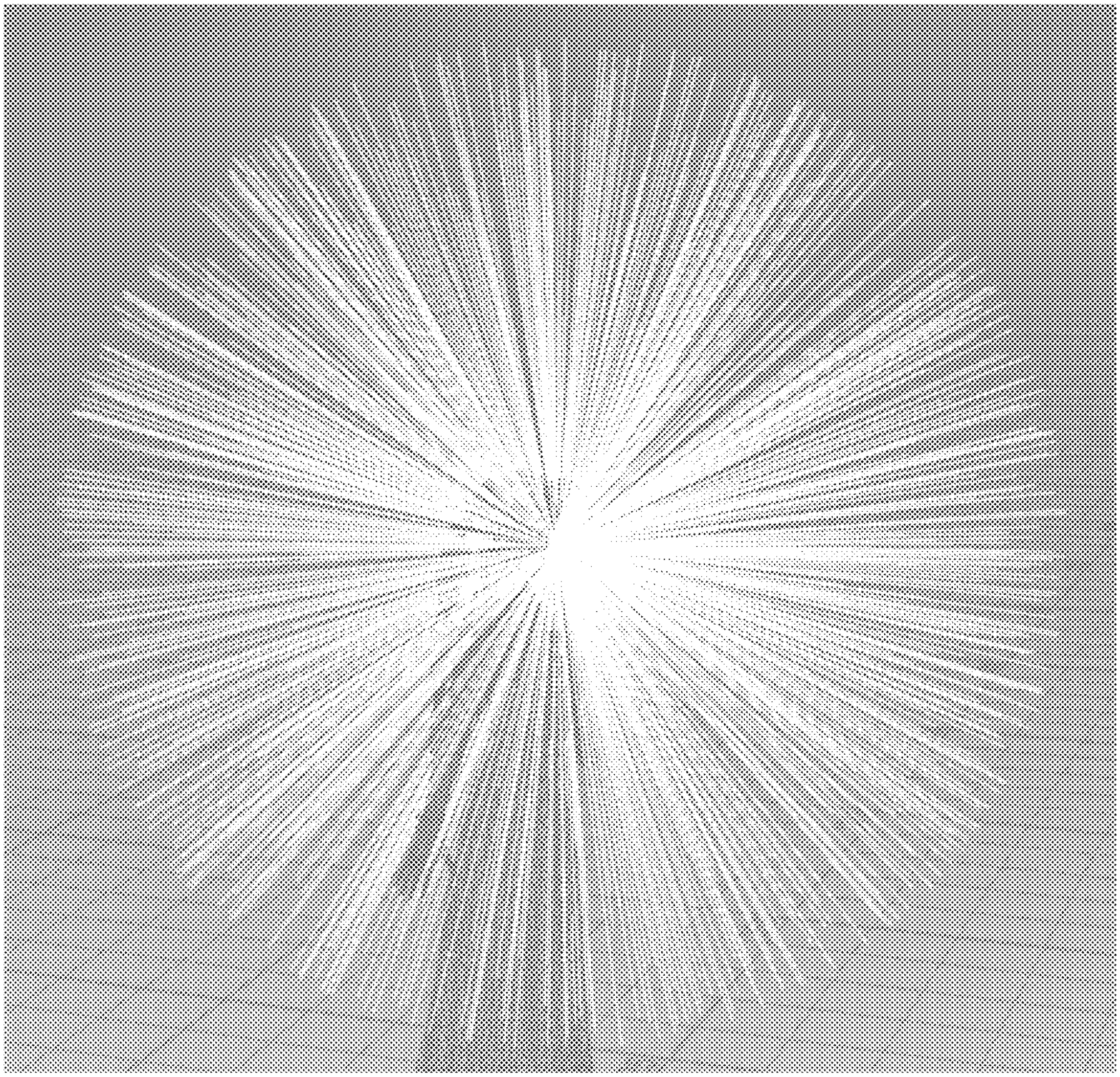
FIG. 8 is a schematic diagram of virtual light sources emitting rays toward a target vertex according to an embodiment of this application.
Figure 9:
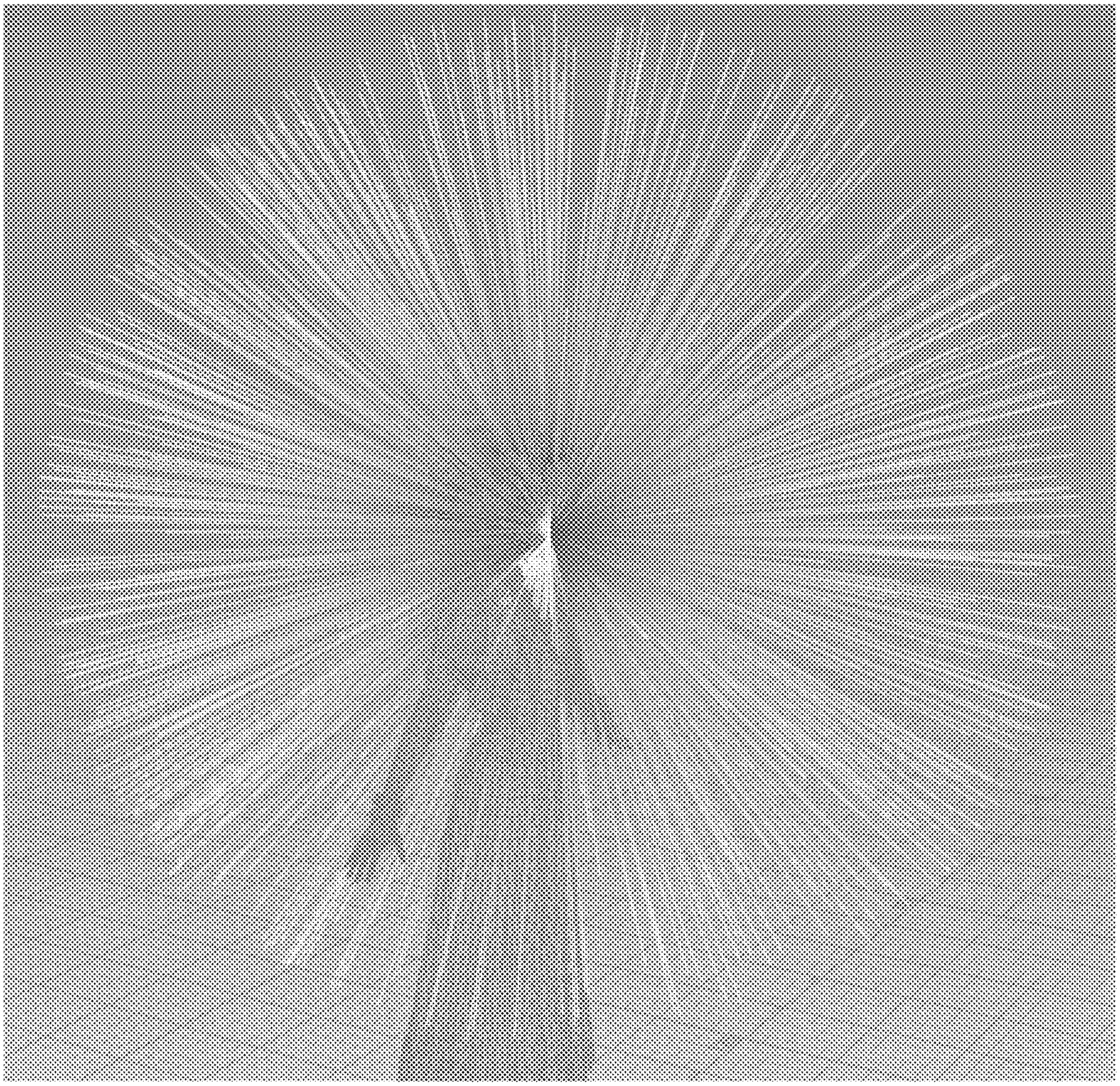
FIG. 9 is a schematic diagram of a result of occlusion detection according to an embodiment of this application.

In this operation, each virtual light source is used as a starting point of rays to emitted toward the target vertex to simulate light directions of the virtual light sources illuminating the target vertex. An purpose of providing the virtual light sources is to detect whether there is an obstruction (which occludes light emitted by the virtual light sources from being projected to the target vertex) between the virtual light sources and the target vertex. If a length of the ray is configured to be greater than or equal to a distance between the virtual light source and the target vertex, the ray may collide with the target vertex, resulting in incorrect detection. To avoid this problem, for any target virtual light source among the plurality of virtual light sources, a length of a ray emitted by the target virtual light source toward the target vertex is configured to be less than a distance between the target virtual light source and the target vertex. The length of the ray is restricted to prevent determining the target vertex as an obstruction in error, thereby increasing accuracy of secondary light occlusion rendering. The length of the ray is better to be not too short, as this may result in missing detection of an occlusion close to the target vertex. In an example, the length of the ray is configured to be 0.999 times the distance between the target vertex and the target virtual light source. The length may be configured based on a size of the model, characteristics of model design, and the like, and is not limited herein. FIG. 8 is a schematic diagram of virtual light sources emitting rays toward a target vertex. Based on the rays shown in FIG. 8, FIG. 9 is a schematic diagram of an occlusion detection result. There are a plurality of dark regions near the head of a model and at the center of FIG. 9. The dark regions in FIG. 9 indicate that rays are occluded in the regions. If a ray is occluded, an occlusion value of the ray may be denoted as 1. If a ray is not occluded, an occlusion value of the ray is denoted as 0. The foregoing occlusion values of 0 or 1 is used as vertex occlusion information of the target vertex.

As mentioned above, there are a plurality of virtual light sources provided. For example, if N virtual light sources emit rays toward the target vertex, there may be N occlusion values corresponding to the rays. Occlusion information of rays emitted by the plurality of virtual light sources may be used as the vertex occlusion information corresponding to the target vertex. In other words, the vertex occlusion information corresponding to the target vertex includes N occlusion values, and the N occlusion values respectively correspond to the N virtual light sources provided for the target vertex.

S603: Encode corresponding occlusion information based on direction information of a plurality of rays, and use obtained encoding results of the occlusion information of the plurality of rays jointly as an encoding result of the occlusion information corresponding to the target vertex.

In this embodiment of this application, direction information of a ray is used to encode occlusion information of the ray. Therefore, accurate one-to-one encoding is achieved. In an exemplary implementation, a model preprocessing tool for performing the foregoing operations S601-S603 is Hondini software. Because Houdini uses a right-handed coordinate system, and Unity uses a left-handed coordinate system, to enable encoded data to be properly used in Unity, in this embodiment of this application, S603 may include the following specific operations:

- converting the direction information of the plurality of rays from the right-handed coordinate system into the left-handed coordinate system;
- converting direction information converted into the left-handed coordinate system into tangent space of the target vertex; and
- encoding, based on direction information of the plurality of rays that is converted into the tangent space of the target vertex, the occlusion information of the corresponding rays in the vertex occlusion information corresponding to the target vertex.

The direction information of the ray is converted between the left-handed coordinate system and the right-handed coordinate system to implement initial conversion of the direction information between different coordinate systems. Because the ray is in the world coordinate system where the virtual object is located, and the vertex has the tangent space corresponding to the vertex, to enable data subsequently stored in the vertex to be calculated correctly after the model is rotated, a direction of the ray needs to be converted into a tangent space coordinate. In other words, to achieve accurate encoding of vertex-level information, the direction information converted into the left-handed coordinate system is further converted into the tangent space of the target vertex. Then, the occlusion information of the corresponding rays in the vertex occlusion information is encoded based on the direction information converted into the tangent space. For example, there are N virtual light sources emitting rays toward the target vertex, and N occlusion values of the target vertex are obtained. Direction information of N rays in different directions that is converted into the tangent space of the target vertex is used to encode corresponding occlusion values. Through the foregoing conversion, the encoding is based on the direction information of the ray in the tangent space of the vertex, so that accurate one-to-one encoding is achieved, and accurate information can be restored during decoding. To implement conversion into the left-handed coordinate system, an x-axis among xyz of the direction of the ray needs to be negated. Conversion into a tangent space coordinate system may include: obtaining a tangent T, a bitangent B, and a normal N of the vertex using Houdini, and negating x-axis among three vectors of TBN to form a TBN matrix in the left-handed coordinate system of Unity; obtaining an inverse matrix invTBN matrix of the TBN matrix based on the TBN matrix; and using the invTBN matrix to right multiply each direction vector of the ray to obtain a direction vector of the ray in a tangent space coordinate system of Unity.

The encoding result of the occlusion information corresponding to the target vertex is obtained when S603 is completed. Similarly, the encoding results of the occlusion information corresponding to all the vertexes on the model may be obtained by performing S601-S603. To facilitate subsequent rendering and reduce consumption of computing performance of a device during data reading, the following manner is used for storage. Refer to S604 for details.

S604: Store the encoding results of the vertex occlusion information corresponding to the plurality of vertexes in empty slots of UV data of corresponding vertexes.

The models UV2 and UV3 are described previously, each of the model includes an empty slot for data storage. The encoding results of the vertex occlusion information corresponding to the vertexes may be stored in the empty slots. For example, an encoding result encoded using spherical harmonics includes four spherical harmonic coefficients, and UV2 and UV3 each include two empty slots. Two of the four spherical harmonic coefficients may be stored in the two empty slots of UV2, and the other two spherical harmonic coefficients may be stored in the two empty slots of UV3. Therefore, at a rendering stage, the game engine Unity obtains the encoding results of the vertex occlusion information corresponding to the plurality of vertexes on the model of the virtual object, specifically, the vertex shader of Unity obtains the encoding results of the vertex occlusion information of the corresponding vertexes from the UV data of the plurality of vertexes. The empty slots of data of UV2 and UV3 are properly used in this application. Because the encoding results exist in the empty slots of the UV data of the corresponding vertexes, it is convenient for the shader of the game engine to read the data, thereby reducing performance consumption of a computing device during reading from a device and performing operation.

The foregoing describes the process of preprocessing the vertexes on the model with reference to FIG. 6. The process is essentially to extract and encode the vertex occlusion information of the vertexes on the model, and then store the encoded vertex occlusion information in the data of the vertexes on the model, so that the encoding results of the vertex occlusion information is part of the data of the vertexes. In this way, a model having the encoding results of the vertex occlusion information is obtained. When a Houdini product is used in practice, setting is carried out according to the following operations:

(1) Import a model of a virtual object in Houdini. Specifically, a file of the model of the virtual object of Unity may be imported.

(2) Distinguish between an occluded part and a non-occluded part. For example, a transparent part is a non-occluded part. An opaque part is an occluded part. This operation for distinguishing may be performed manually by an art designer, or the distinguishing may be automatically performed by using some transparency recognition algorithms.

(3) Export the model. An export path of the model may be consistent with an import path. Specifically, the model may be exported to a related folder of the shader under resources of Unity.

In embodiments of this application, a switch or an option for enabling a rendering function in the solution of this application is provided in an interface for enabling the shader. For example, when the Unity engine needs to be used to render a secondary light occlusion rendering effect, a user checks the option for enabling the rendering function of embodiments to enable the shader to support the rendering function of embodiments of this application, so that the enabled shader can implement subsequent rendering of the secondary light occlusion effect.

Figure 10:
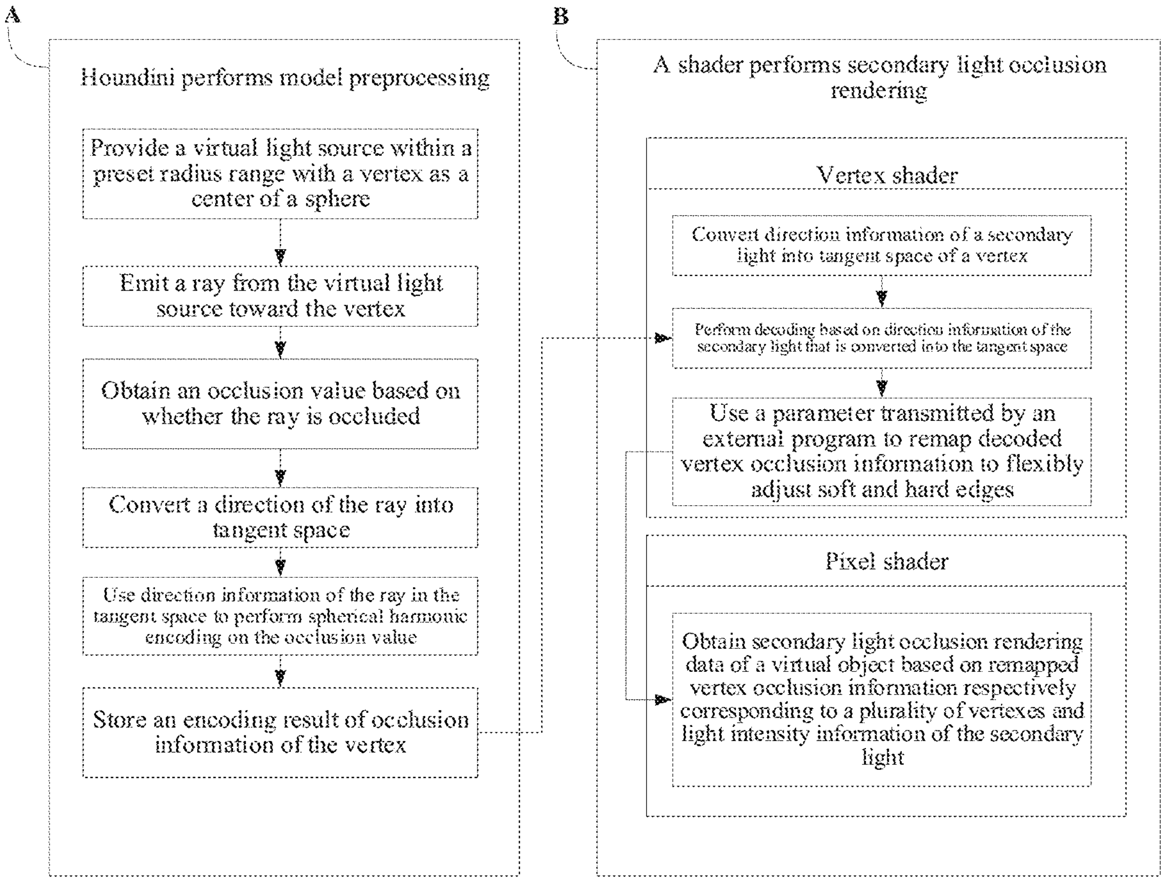
FIG. 10 is a flowchart of another secondary light occlusion rendering method according to an embodiment of this application.

FIG. 10 is a flowchart of another secondary light occlusion rendering method according to an embodiment of this application. Part A of the flowchart shows a preprocessing process of a model by Houdini software, and part B of the flowchart shows a rendering process of the shader of the Unity engine. The preprocessing process and the rendering process are described in detail in the embodiments described above, and are not described here again. For an overall process including the preprocessing process, refer to FIG. 10.

The following specifically describes application of spherical harmonics in encoding and decoding.

The occlusion values of the discrete rays in the embodiment described above each are regarded as an approximate function $f(x)$ distributed in spherical space, a spherical harmonic basis function is $$y_l^m,$$

and a spherical harmonic coefficient is $$c_l^m.$$

Equations of the approximate function and the spherical harmonic coefficient are as the following equations (1) and (2):

$$\int f(x)\,dx = \sum_{l=0}^{n} \sum_{m=-l}^{l} c_l^m y_l^m \tag{1}$$

$$c_l^m = \int_S f(s) y_l^m(s)\,ds \tag{2}$$

According to a table of a spherical harmonic basis function, in this solution, an L0L1-order equation of the spherical harmonics in a rectangular coordinate system is used as a basis function $$y_l^m,$$

and a radius is r=1. For the table of the spherical harmonic basis function, refer to FIG. 11. Specifically, equations in rectangular coordinates in a box in FIG. 11 is used. For ease of description, it is assumed that i=1*(l+1)+m. Therefore, the foregoing equations (1) and (2) may be changed into (3) and (4), respectively:

$$f(s) = \sum_{i=0}^{n^2} c_i y_i(s) \tag{3}$$

$$c_i = \int_B f(s) y_i(s)\, ds \tag{4}$$

To solve the spherical harmonic coefficient $c_i$, the Monte Carlo method can be used to perform discretization to obtain an equation (5):

$$c_i = \int_S f(s) y_i(s)\, ds \approx \frac{1}{N} \sum_{j=1}^{N} f(s_j) \omega(s_j) y_i(s_j) \tag{5}$$

In the equation (5), $\omega(s_j)$ is a weight coefficient. Because the function is distributed on a uniform sphere surface, for sampling on the uniform sphere surface, a result of summing using the weight coefficient is an area of the sphere surface, which becomes $4\pi r^2$ when put in front of a summation symbol. Because r=1, ω(s) is equal to 4π. Therefore, in the equation (5), ω(s) can be put outside the summation symbol to obtain:

$$c_i = \frac{4\pi}{N} \sum_{j=1}^{N} f(s_j) y_i(s_j) \tag{6}$$

$f(s_j)$ in the spherical harmonic coefficient equation (6) is substituted into the plurality of occlusion values obtained by performing occlusion detection using the rays of the plurality of virtual light sources as described above, so that four spherical harmonic coefficients can be obtained as encoding results, and the encoding results are stored. In other words, the occlusion values are substituted into the equation (6) as results of the function.

When the Unity engine performs decoding, direction information of secondary lights is obtained and converted into a tangent space coordinate system in the vertex shader. Specifically, a tangent T, a bitangent B, and a normal N can be obtained to form a TBN matrix. An inverse matrix, i.e., invTBN matrix, of the TBN matrix is obtained based on the TBN matrix. The invTBN matrix is used to right multiply direction vectors xyz of the secondary light to obtain direction vectors xyz of the secondary light in the tangent space coordinate system of Unity through conversion. During decoding, the direction information of secondary light in the tangent space in the previous operation and the spherical harmonic coefficients stored in the data of the vertexes are used for decoding of the spherical harmonics to calculate the occlusion values.

A decoding equation is as follows:

$$f(s) = \sum_{i=0}^{n^2} c_i y_i(s), \tag{7}$$

When n is equal to a second order coefficient, $n^2=4$. $c_i$ is the spherical harmonic coefficient stored in the data of the vertex. $y_i(s)$ is the spherical harmonic basis function, for which reference may be made to FIG. 11, where i=l*(l+1)+m.

Figure 12:
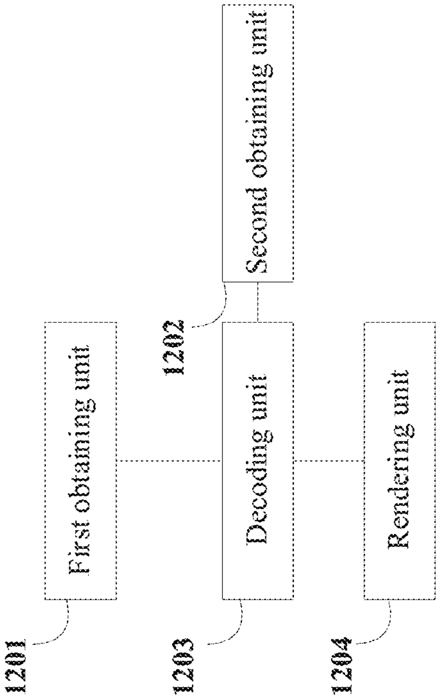
FIG. 12 is a schematic diagram of a structure of a secondary light occlusion rendering apparatus according to an embodiment of this application.

According to the secondary light occlusion rendering method provided in the foregoing embodiment, this application also provides a secondary light occlusion rendering apparatus. Descriptions are made in the following with reference to FIG. 12. FIG. 12 is a schematic diagram of a structure of a secondary light occlusion rendering apparatus according to an embodiment of this application. As shown in FIG. 12, the secondary light occlusion rendering apparatus includes:

a first obtaining unit 1201, configured to obtain direction information of a secondary light in an environment where a virtual object is located;

a second obtaining unit 1202, configured to obtain data of a plurality of vertexes on a model of the virtual object, the data of each vertex including an encoding result of vertex occlusion information, and the vertex occlusion information being obtained by performing light occlusion detection on the vertex in advance;

a decoding unit 1203, configured to decode the encoding results based on the direction information to obtain decoded vertex occlusion information; and a rendering unit 1204, configured to obtain secondary light occlusion rendering data of the virtual object based on the decoded vertex occlusion information respectively corresponding to the plurality of vertexes and light intensity information of the secondary light.

The vertex occlusion information is detected in advance and stored in the data of the vertexes in an encoded form, and during rendering, the data of the vertexes can be simply fetched to perform corresponding decoding, without a need of reading textures frame by frame. Therefore, consumption of performance of a computing device can be reduced, and high performance of a device is ensured while a secondary light occlusion effect is rendered and represented, which makes the technical solution more applicable to a mobile device. In addition, the rendering solution is based on vertexes on a model, and is therefore not affected by a change in a movement direction of the virtual object in a world coordinate system of the virtual object. Furthermore, in this solution, importance of a direction of the secondary light is also taken into consideration. The encoding results in the data of the vertexes are decoded based on the direction information of the secondary light, to form the secondary light occlusion rendering data based on both the decoded vertex occlusion information and the light intensity of the secondary light. Therefore, according to this rendering solution, a natural and physically accurate secondary light occlusion effect can be displayed, thereby improving visual experience of a user (game player or animation viewer).

In an exemplary implementation, the decoding unit is configured to:

convert, for any target vertex among the plurality of vertexes, the direction information into tangent space of the target vertex to obtain converted direction information, the converted direction information being configured for identifying a direction of the secondary light in the tangent space of the target vertex; and decode the encoding result based on the converted direction information to obtain decoded vertex occlusion information corresponding to the target vertex.

In an exemplary implementation, a quantity of secondary lights in the environment is more than one. The decoding unit is configured to:

decode the encoding results of the vertex occlusion information of the plurality of vertexes one by one based on direction information of a plurality of secondary lights respectively to obtain decoded vertex occlusion information, the decoded vertex occlusion information including decoding result sets having one-to-one correspondence to the plurality of secondary lights, and the decoding result set including decoded vertex occlusion information of the plurality of vertexes in respect of a same secondary light.

The rendering unit is configured to:

obtain rendering sub-data of a corresponding secondary light based on the decoding result set and light intensity information of the corresponding secondary light; and obtain occlusion rendering data of the virtual object under the plurality of secondary lights based on rendering sub-data of the plurality of secondary lights.

In an exemplary implementation, the encoding result of the vertex occlusion information is a spherical harmonic coefficient obtained by encoding the vertex occlusion information using spherical harmonics. The decoding unit is specifically configured to:

perform spherical harmonic decoding on the spherical harmonic coefficient based on the direction information.

In an exemplary implementation, the rendering unit is configured to:

use a parameter transmitted by an external program to remap the decoded vertex occlusion information of the plurality of vertexes to obtain occlusion values respectively corresponding to the plurality of vertexes; and obtain the secondary light occlusion rendering data of the virtual object based on the occlusion values respectively corresponding to the plurality of vertexes and the light intensity information of the secondary light.

In an exemplary implementation, the secondary light occlusion rendering apparatus further includes: a preprocessing unit, configured to perform the following operations before obtaining the encoding results of the vertex occlusion information respectively corresponding to the plurality of vertexes on the model of the virtual object:

providing, for any target vertex among the plurality of vertexes, a plurality of virtual light sources within a preset range around the target vertex;

using, based on rays emitted by the plurality of virtual light sources toward the target vertex, determined occlusion information respectively corresponding to the plurality of virtual light sources as vertex occlusion information corresponding to the target vertex, the occlusion information being configured for identifying whether rays emitted by a corresponding virtual halo are occluded by vertexes other than the target vertex; and encoding corresponding occlusion information based on direction information of a plurality of rays, and using obtained encoding results of the occlusion information of the plurality of rays jointly as an encoding result of the occlusion information corresponding to the target vertex.

In an exemplary implementation, the preprocessing unit is specifically configured to:

convert the direction information of the plurality of rays from the right-handed coordinate system into the left-handed coordinate system;

convert direction information converted into the left-handed coordinate system into tangent space of the target vertex; and encode, based on direction information of the plurality of rays that is converted into the tangent space of the target vertex, the occlusion information of the corresponding rays in the vertex occlusion information corresponding to the target vertex.

In an exemplary implementation, for any target virtual light source among the plurality of virtual light sources, a length of a ray emitted by the target virtual light source toward the target vertex is configured to be less than a distance between the target virtual light source and the target vertex.

In an exemplary implementation, the secondary light occlusion rendering apparatus further includes:

a storage unit, configured to store the encoding results of the vertex occlusion information corresponding to the plurality of vertexes in empty slots of UV data of corresponding vertexes; and the second obtaining unit 1202, specifically configured to: obtain, from the UV data of the plurality of vertexes, the encoding results of the vertex occlusion information of the corresponding vertexes.

The following describes a structure of a rendering device for secondary light generation in the form of a server and a terminal device, respectively.

Figure 13:
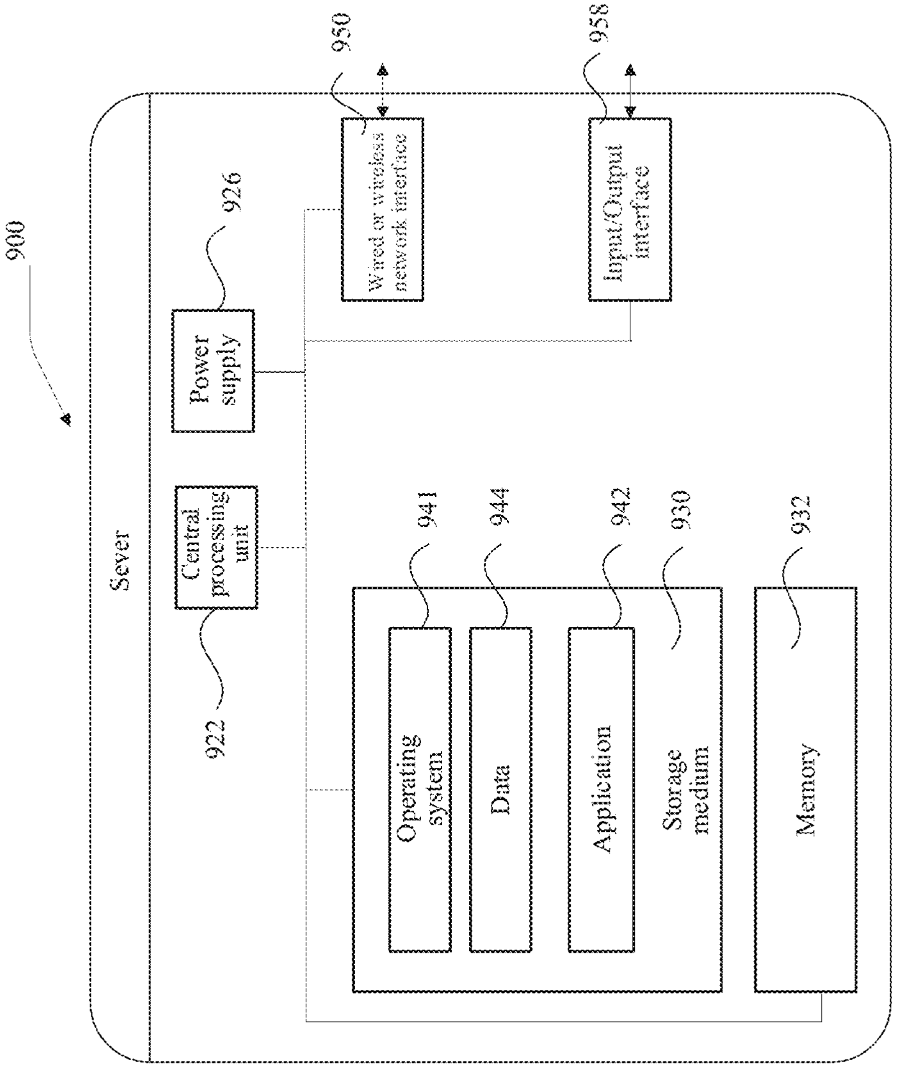
FIG. 13 is a schematic diagram of a structure of a server according to an embodiment of this application.

FIG. 13 is a schematic diagram of a structure of a server according to an embodiment of this application. The server 900 may vary greatly due to different configurations or performance, and may include one or more central processing units (CPUs) 922 (for example, one or more processors), a memory 932, and one or more storage media 930 (for example, one or more mass storage devices) that store application programs 942 or data 944. The memory 932 and the storage medium 930 may be used for temporary storage or persistent storage. A program stored in the storage medium 930 may include one or more modules (not shown), and each module may include a series of instruction operations on the server. Further, the CPU 922 may be configured to communicate with the storage medium 930, and perform, on the server 900, the series of instruction operations on the storage medium 930.

The server 900 may further include one or more power supplies 926, one or more wired or wireless network interfaces 950, one or more input/output interfaces 958, and/or one or more operating systems 941, for example, Windows Server™, Mac OS X™, Unix™, Linux™, or FreeBSD™.

The CPU 922 is configured to perform the following operations:

obtaining direction information of a secondary light in an environment where a virtual object is located and data of a plurality of vertexes on a model of the virtual object, the data of each vertex including an encoding result of vertex occlusion information;

decoding the encoding results based on the direction information to obtain decoded vertex occlusion information, the vertex occlusion information being obtained by performing light occlusion detection on the vertex in advance; and obtaining secondary light occlusion rendering data of the virtual object based on the decoded vertex occlusion information respectively corresponding to the plurality of vertexes and light intensity information of the secondary light.

Figure 14:
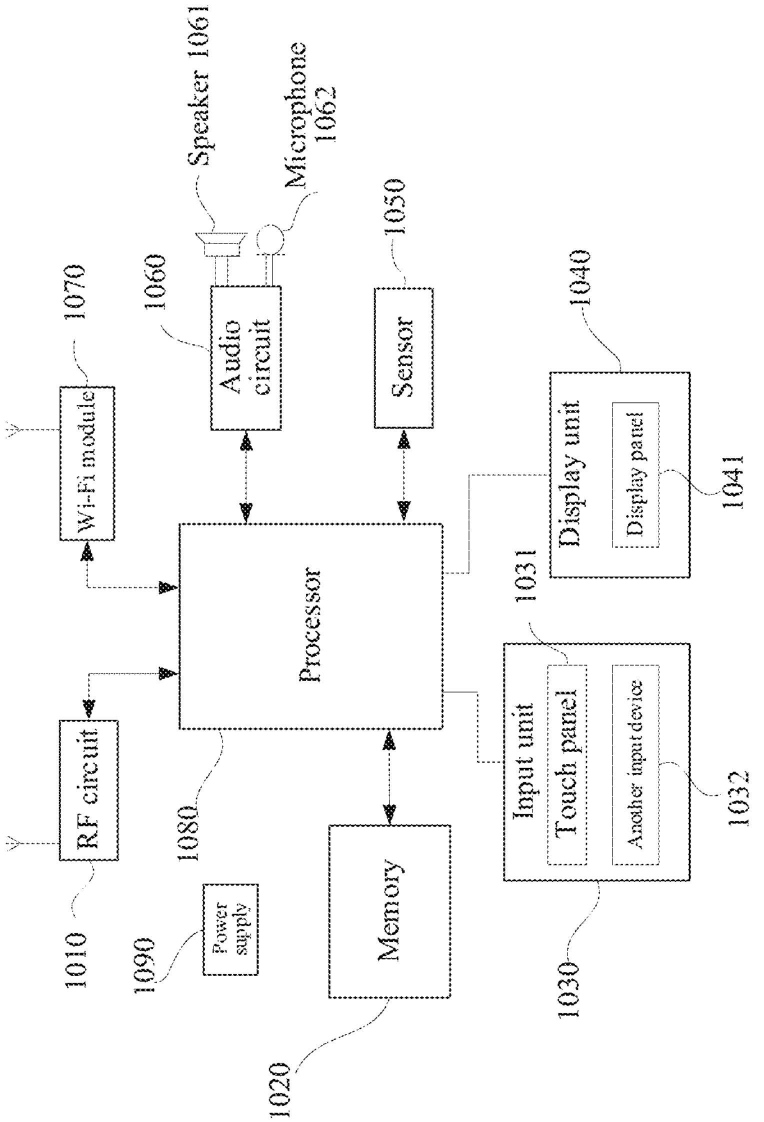
FIG. 14 is a schematic diagram of a structure of a terminal device according to an embodiment of this application.

An embodiment of this application further provides another rendering device for secondary light generation. As shown in FIG. 14, for case of description, only parts related to embodiments of this application are shown. For specific technical details not disclosed, reference may be made to the method embodiments of this application. The terminal may be any terminal device such as a mobile phone, a tablet computer, a personal digital assistant (PDA), a point of sales (POS), or an on-board computer. An example in which the terminal is a mobile phone is used.

FIG. 14 is a block diagram of a structure of a part of a mobile phone related to a terminal according to an embodiment of this application. Refer to FIG. 14. The mobile phone includes: components such as a radio frequency (RF) circuit 1010, a memory 1020, an input unit 1030, a display unit 1040, a sensor 1050, an audio circuit 1060, a wireless fidelity (Wi-Fi) module 1070, a processor 1080, and a power supply 1090. A person skilled in the art may understand that the structure, shown in FIG. 14, of the mobile phone does not constitute a limitation on the mobile phone, and the mobile phone may include more or fewer components than those shown in the figure, or a combination of some components, or a different component deployment may be used.

The following specifically describes the components of the mobile phone with reference to FIG. 14.

The RF circuit 1010 may be configured to receive and send a signal during information reception and transmission or calling. Particularly, after receiving downlink information from a base station, the RF circuit 1010 sends the information to the processor 1080 for processing. In addition, the RF circuit 1010 sends related uplink data to the base station. Generally, the RF circuit 1010 includes but is not limited to an antenna, at least one amplifier, a transceiver, a coupler, a low noise amplifier (LNA), a duplexer, and the like. In addition, the RF circuit 1010 may also communicate with a network and another device in a wireless manner. The wireless communication may be based on any communication standard or protocol, including but not limited to a Global System for Mobile Communications (GSM), a general packet radio service (GPRS), code division multiple access (CDMA), wideband code division multiple access (WCDMA), long term evolution (LTE), an email, a short message service (SMS), or the like.

The memory 1020 may be configured to store a software program and a module. The processor 1080 runs the software program and the module that are stored in the memory 1020, to perform various functional applications and data processing of the mobile phone. The memory 1020 may mainly include a program storage zone and a data storage zone. The program storage zone may store an operating system, an application program that is required by at least one function (for example, a voice playing function and an image playing function), and the like. The data storage zone may store data (for example, audio data and a phone book) created based on use of the mobile phone and the like. In addition, the memory 1020 may include a high-speed random access memory, and may alternatively include a non-volatile memory, for example, at least one magnetic disk storage device, a flash memory device, or another non-volatile solid-state storage device.

The input unit 1030 may be configured to receive input digit or character information, and generate a keyboard signal input related to user settings and function control of the mobile phone. Specifically, the input unit 1030 may include a touch panel 1031 and another input device 1032. The touch panel 1031, which may also be referred to as a touch screen, may collect a touch operation of a user on or near the touch panel (such as an operation of a user on or near the touch panel 1031 performed by using any suitable object or accessory such as a finger or a stylus), and drive a corresponding connection apparatus according to a preset program. In one embodiment, the touch panel 1031 may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and sends the touch point coordinates to the processor 1080. Moreover, the touch controller can receive a command sent from the processor 1080 and execute the command. In addition, the touch panel 1031 may be implemented into various types, such as a resistive type, a capacitance type, an infrared type, and a surface sound wave type. In addition to the touch panel 1031, the input unit 1030 may further include another input device 1032. Specifically, the input device 1032 may include, but is not limited to, one or more of a physical keyboard, a functional key (such as a volume control key or a switch key), a track ball, a mouse, and a joystick.

The display unit 1040 may be configured to display information inputted by the user or information provided for the user, and various menus of the mobile phone. The display unit 1040 may include a display panel 1041. In one embodiment, the display panel 1041 may be configured in the form of a liquid crystal display (LCD), an organic light-emitting diode (OLED), or the like. Further, the touch panel 1031 may cover the display panel 1041. After detecting a touch operation on or near the touch panel 1031, the touch panel 1031 transfers the touch operation to the processor 1080, to determine a type of a touch event. Then, the processor 1080 provides a corresponding visual output on the display panel 1041 according to the type of the touch event. Although in FIG. 14, the touch panel 1031 and the display panel 1041 are used as two separate parts to implement input and output functions of the mobile phone, in some embodiments, the touch panel 1031 and the display panel 1041 may be integrated to implement the input and output functions of the mobile phone.

The mobile phone may further include at least one sensor 1050 such as an optical sensor, a motion sensor, and other sensors. Specifically, the optical sensor may include an ambient light sensor and a proximity sensor, where the ambient light sensor may adjust luminance of the display panel 1041 according to the luminance of the ambient light, and the proximity sensor may switch off the display panel 1041 and/or backlight when the mobile phone is moved to the ear. As one type of motion sensor, an acceleration sensor can measure accelerations in various directions (generally on three axes), may detect magnitude and a direction of the gravity when static, and may be used for an application during recognition of the attitude of the mobile phone (for example, switching between landscape orientation and portrait orientation, a related game, or magnetometer attitude calibration), a function related to recognition of vibration (such as a pedometer and a knock), and the like. Other sensors, such as a gyroscope, a barometer, a hygrometer, a thermometer, and an infrared sensor, which may be configured in the mobile phone, are not described in detail herein.

The audio circuit 1060, a speaker 1061, and a microphone 1062 may provide audio interfaces between the user and the mobile phone. The audio circuit 1060 may convert received audio data into an electric signal and transmit the electric signal to the speaker 1061. The speaker 1061 converts the electric signal into a sound signal and outputs the sound signal. In addition, the microphone 1062 converts a collected sound signal into an electric signal. The audio circuit 1060 receives the electric signal, converts the electric signal into audio data, and outputs the audio data to the processor 1080 for processing. Then, the processor 1080 sends the audio data to, for example, another mobile phone by using the RF circuit 1010, or outputs the audio data to the memory 1020 for further processing.

Wi-Fi is a short-distance wireless transmission technology. The mobile phone may help, by using the Wi-Fi module 1070, a user to receive and send an email, browse a web page, access stream media, and the like, to allow wireless broadband Internet access of the user. Although FIG. 14 shows the Wi-Fi module 1070, the Wi-Fi module 1070 is not a necessary component of the mobile phone, and may be omitted as needed provided that the scope of the essence of the present disclosure is not changed.

The processor 1080 is a control center of the mobile phone, and is connected to various parts of the entire mobile phone via various interfaces and lines. The processor 1080 executes various functions of the mobile phone and performs data processing by running or executing a software program and/or a module stored in the memory 1020 and invoking data stored in the memory 1020. In one embodiment, the processor 1080 may include one or more processing units. Preferably, the processor 1080 may integrate an application processor and a modem. The application processor mainly processes an operating system, a user interface, an application program, and the like. The modem mainly processes wireless communication. The foregoing modem processor may alternatively not be integrated into the processor 1080.

The mobile phone further includes the power supply 1090 (such as a battery) for supplying power to the components. Preferably, the power supply may be logically connected to the processor 1080 via a power supply management system, thereby implementing functions such as charging, discharging, and power consumption management based on the power supply management system.

Although not shown in the figure, the mobile phone may further include a camera, a Bluetooth module, and the like, which are not described in detail herein.

In this embodiment of this application, the processor 1080 included in the terminal further has the following functions:

obtaining direction information of a secondary light in an environment where a virtual object is located and data of a plurality of vertexes on a model of the virtual object, the data of each vertex including an encoding result of vertex occlusion information;

decoding the encoding results based on the direction information to obtain decoded vertex occlusion information, the vertex occlusion information being obtained by performing light occlusion detection on the vertex in advance; and obtaining secondary light occlusion rendering data of the virtual object based on the decoded vertex occlusion information respectively corresponding to the plurality of vertexes and light intensity information of the secondary light.

An embodiment of this application further provides a non-transitory computer-readable storage medium, configured to store a computer program, the computer program being configured to perform any one of the implementations of the secondary light occlusion rendering method according to the foregoing embodiments.

An embodiment of this application further provides a computer program product including a computer program, the computer program product, when run on a computer, enabling the computer to perform any one of the implementations of the secondary light occlusion rendering method according to the foregoing embodiments.

A person skilled in the art may clearly understand that, for ease and clearness of description, for specific operating processes of the foregoing described system and device, reference may be made to corresponding processes in the foregoing method embodiments, and details are not described herein again.

In the embodiments provided in this application, the disclosed system and method may be implemented in other manners. For example, the foregoing system embodiments are described merely as examples. For example, the system division is merely logical function division and may be other division in actual implementation. For example, a plurality of systems may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The systems described as separate parts may or may not be physically separate, and parts displayed as units may or may not be physical units, may be located at one position, or may be distributed on a plurality of network units. Some or all of the units may be selected based on actual requirements to achieve the objectives of the solutions of embodiments.

In addition, functional units in embodiments of this application may be integrated into one processing unit, or each of the units may be physically separated, or two or more units may be integrated into one unit. The integrated unit may be implemented in the form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the related art, all or a part of the technical solutions may be implemented in a form of a software product. The computer software product is stored in a storage medium, and includes several instructions for instructing a computer device (which may be a personal computer, a server, a network device, or the like) to perform all or a part of the operations of the method embodiments of this application. The foregoing storage medium includes any medium that can store program code, such as a USB flash drive, a removable hard disk, a read-only memory (ROM), a random access memory (RAM), a magnetic disk, and an optical disc.

The foregoing embodiments are merely intended for describing the technical solutions of this application, but not for limiting this application. Although this application are described in detail with reference to the foregoing embodiments, a person of ordinary skill in the art needs to understand that modifications may still be made to the technical solutions described in the foregoing embodiments, or equivalent replacements may be made to the part of the technical features, provided that such modifications or replacements do not cause the essence of corresponding technical solutions to depart from the spirit and scope of the technical solutions of the embodiments of the present disclosure.

What is claimed is:

1. A secondary light occlusion rendering method, performed by a computer device, the method comprising:

obtaining direction information of a secondary light in an environment including a virtual object and data of a plurality of vertexes on a model of the virtual object, the data of each vertex comprising an encoding result of vertex occlusion information;

converting, for a target vertex among the plurality of vertexes, the direction information into tangent space of the target vertex to obtain converted direction information, the converted direction information being configured for identifying a direction of the secondary light in the tangent space of the target vertex;

decoding the encoding results based on the converted direction information to obtain decoded vertex occlusion information corresponding to the target vertex; and obtaining secondary light occlusion rendering data of the virtual object based on the decoded vertex occlusion information respectively corresponding to the plurality of vertexes and light intensity information of the secondary light.

2. The method according to claim 1, wherein a quantity of secondary lights in the environment is more than one, and the decoding the encoding results based on the converted direction information to obtain decoded vertex occlusion information corresponding to the target vertex comprises:

decoding the encoding results of the vertex occlusion information of the plurality of vertexes one by one based on direction information of a plurality of secondary lights respectively to obtain decoded vertex occlusion information, the decoded vertex occlusion information comprising decoding result sets having one-to-one correspondence to the plurality of secondary lights, and the decoding result sets each comprising decoded vertex occlusion information of the plurality of vertexes in respect of a same secondary light; and the obtaining secondary light occlusion rendering data of the virtual object based on the decoded vertex occlusion information respectively corresponding to the plurality of vertexes and light intensity information of the secondary light comprises:

obtaining rendering sub-data of a corresponding secondary light based on the decoding result set and light intensity information of the corresponding secondary light; and obtaining secondary light occlusion rendering data of the virtual object under the plurality of secondary lights based on rendering sub-data of the plurality of secondary lights.

3. The method according to claim 1, wherein the encoding result of the vertex occlusion information is a spherical harmonic coefficient obtained by encoding the vertex occlusion information using spherical harmonics; and the decoding the encoding results based on the direction information comprises:

performing spherical harmonic decoding on the spherical harmonic coefficient based on the direction information.

4. The method according to claim 1, wherein the obtaining secondary light occlusion rendering data of the virtual object based on the decoded vertex occlusion information respectively corresponding to the plurality of vertexes and light intensity information of the secondary light comprises:

using a parameter transmitted by an external program to remap the decoded vertex occlusion information to obtain occlusion values respectively corresponding to the plurality of vertexes; and obtaining the secondary light occlusion rendering data of the virtual object based on the occlusion values respectively corresponding to the plurality of vertexes and the light intensity information of the secondary light.

5. The method according to claim 1, wherein the method further comprises:

providing, for any target vertex among the plurality of vertexes, a plurality of virtual light sources within a preset range around the target vertex;

using, based on rays emitted by the plurality of virtual light sources toward the target vertex, determined occlusion information respectively corresponding to the plurality of virtual light sources as vertex occlusion information corresponding to the target vertex, the occlusion information being configured for identifying whether rays emitted by a corresponding virtual halo are occluded by vertexes other than the target vertex; and encoding corresponding occlusion information based on direction information of a plurality of rays, and using obtained encoding results of the occlusion information of the plurality of rays jointly as an encoding result of the occlusion information corresponding to the target vertex.

6. The method according to claim 1, further comprising:

storing the encoding results of the vertex occlusion information corresponding to the plurality of vertexes in empty slots of UV data of corresponding vertexes; and obtaining the encoding results of the vertex occlusion information respectively corresponding to the plurality of vertexes on the model of the virtual object comprises:

obtaining, from the UV data of the plurality of vertexes, the encoding results of the vertex occlusion information of the corresponding vertexes.

7. A computer device, comprising a processor and a memory, the memory being configured to store a computer program and transmit the computer program to the processor, and the computer program, when executed by the processor, causing the computer device to perform a secondary light occlusion rendering method including:

obtaining direction information of a secondary light in an environment including a virtual object and data of a plurality of vertexes on a model of the virtual object, the data of each vertex comprising an encoding result of vertex occlusion information;

converting, for a target vertex among the plurality of vertexes, the direction information into tangent space of the target vertex to obtain converted direction information, the converted direction information being configured for identifying a direction of the secondary light in the tangent space of the target vertex;

decoding the encoding results based on the converted direction information to obtain decoded vertex occlusion information corresponding to the target vertex; and obtaining secondary light occlusion rendering data of the virtual object based on the decoded vertex occlusion information respectively corresponding to the plurality of vertexes and light intensity information of the secondary light.

8. The computer device according to claim 7, wherein a quantity of secondary lights in the environment is more than one, and the decoding the encoding results based on the converted direction information to obtain decoded vertex occlusion information corresponding to the target vertex comprises:

decoding the encoding results of the vertex occlusion information of the plurality of vertexes one by one based on direction information of a plurality of secondary lights respectively to obtain decoded vertex occlusion information, the decoded vertex occlusion information comprising decoding result sets having one-to-one correspondence to the plurality of secondary lights, and the decoding result sets each comprising decoded vertex occlusion information of the plurality of vertexes in respect of a same secondary light; and the obtaining secondary light occlusion rendering data of the virtual object based on the decoded vertex occlusion information respectively corresponding to the plurality of vertexes and light intensity information of the secondary light comprises:

obtaining rendering sub-data of a corresponding secondary light based on the decoding result set and light intensity information of the corresponding secondary light; and obtaining secondary light occlusion rendering data of the virtual object under the plurality of secondary lights based on rendering sub-data of the plurality of secondary lights.

9. The computer device according to claim 7, wherein the encoding result of the vertex occlusion information is a spherical harmonic coefficient obtained by encoding the vertex occlusion information using spherical harmonics; and the decoding the encoding results based on the direction information comprises:

performing spherical harmonic decoding on the spherical harmonic coefficient based on the direction information.

10. The computer device according to claim 7, wherein the obtaining secondary light occlusion rendering data of the virtual object based on the decoded vertex occlusion information respectively corresponding to the plurality of vertexes and light intensity information of the secondary light comprises:

using a parameter transmitted by an external program to remap the decoded vertex occlusion information to obtain occlusion values respectively corresponding to the plurality of vertexes; and obtaining the secondary light occlusion rendering data of the virtual object based on the occlusion values respectively corresponding to the plurality of vertexes and the light intensity information of the secondary light.

11. The computer device according to claim 7, wherein the method further comprises:

providing, for any target vertex among the plurality of vertexes, a plurality of virtual light sources within a preset range around the target vertex;

using, based on rays emitted by the plurality of virtual light sources toward the target vertex, determined occlusion information respectively corresponding to the plurality of virtual light sources as vertex occlusion information corresponding to the target vertex, the occlusion information being configured for identifying whether rays emitted by a corresponding virtual halo are occluded by vertexes other than the target vertex; and encoding corresponding occlusion information based on direction information of a plurality of rays, and using obtained encoding results of the occlusion information of the plurality of rays jointly as an encoding result of the occlusion information corresponding to the target vertex.

12. The computer device according to claim 7, wherein the method further comprises:

storing the encoding results of the vertex occlusion information corresponding to the plurality of vertexes in empty slots of UV data of corresponding vertexes; and obtaining the encoding results of the vertex occlusion information respectively corresponding to the plurality of vertexes on the model of the virtual object comprises:

obtaining, from the UV data of the plurality of vertexes, the encoding results of the vertex occlusion information of the corresponding vertexes.

13. A non-transitory computer-readable storage medium, storing a computer program therein, and the computer program, when executed by a processor of a computer device, causing the computer device to perform a secondary light occlusion rendering method including:

obtaining direction information of a secondary light in an environment including a virtual object and data of a plurality of vertexes on a model of the virtual object, the data of each vertex comprising an encoding result of vertex occlusion information;

converting, for a target vertex among the plurality of vertexes, the direction information into tangent space of the target vertex to obtain converted direction information, the converted direction information being configured for identifying a direction of the secondary light in the tangent space of the target vertex;

decoding the encoding results based on the converted direction information to obtain decoded vertex occlusion information corresponding to the target vertex; and obtaining secondary light occlusion rendering data of the virtual object based on the decoded vertex occlusion information respectively corresponding to the plurality of vertexes and light intensity information of the secondary light.

14. The non-transitory computer-readable storage medium according to claim 13, wherein a quantity of secondary lights in the environment is more than one, and the decoding the encoding results based on the converted direction information to obtain decoded vertex occlusion information corresponding to the target vertex comprises:

decoding the encoding results of the vertex occlusion information of the plurality of vertexes one by one based on direction information of a plurality of secondary lights respectively to obtain decoded vertex occlusion information, the decoded vertex occlusion information comprising decoding result sets having one-to-one correspondence to the plurality of secondary lights, and the decoding result sets each comprising decoded vertex occlusion information of the plurality of vertexes in respect of a same secondary light; and the obtaining secondary light occlusion rendering data of the virtual object based on the decoded vertex occlusion information respectively corresponding to the plurality of vertexes and light intensity information of the secondary light comprises:

obtaining rendering sub-data of a corresponding secondary light based on the decoding result set and light intensity information of the corresponding secondary light; and obtaining secondary light occlusion rendering data of the virtual object under the plurality of secondary lights based on rendering sub-data of the plurality of secondary lights.

15. The non-transitory computer-readable storage medium according to claim 13, wherein the obtaining secondary light occlusion rendering data of the virtual object based on the decoded vertex occlusion information respectively corresponding to the plurality of vertexes and light intensity information of the secondary light comprises:

using a parameter transmitted by an external program to remap the decoded vertex occlusion information to obtain occlusion values respectively corresponding to the plurality of vertexes; and obtaining the secondary light occlusion rendering data of the virtual object based on the occlusion values respectively corresponding to the plurality of vertexes and the light intensity information of the secondary light.

16. The non-transitory computer-readable storage medium according to claim 13, wherein the method further comprises:

providing, for any target vertex among the plurality of vertexes, a plurality of virtual light sources within a preset range around the target vertex;

using, based on rays emitted by the plurality of virtual light sources toward the target vertex, determined occlusion information respectively corresponding to the plurality of virtual light sources as vertex occlusion information corresponding to the target vertex, the occlusion information being configured for identifying whether rays emitted by a corresponding virtual halo are occluded by vertexes other than the target vertex; and encoding corresponding occlusion information based on direction information of a plurality of rays, and using obtained encoding results of the occlusion information of the plurality of rays jointly as an encoding result of the occlusion information corresponding to the target vertex.

17. The non-transitory computer-readable storage medium according to claim 13, wherein the method further comprises:

storing the encoding results of the vertex occlusion information corresponding to the plurality of vertexes in empty slots of UV data of corresponding vertexes; and obtaining the encoding results of the vertex occlusion information respectively corresponding to the plurality of vertexes on the model of the virtual object comprises:

obtaining, from the UV data of the plurality of vertexes, the encoding results of the vertex occlusion information of the corresponding vertexes.

* * * * *